March 30, 1948.  J. R. SHOFFNER  2,438,827
DUST COLLECTOR VIBRATOR
Filed April 2, 1945
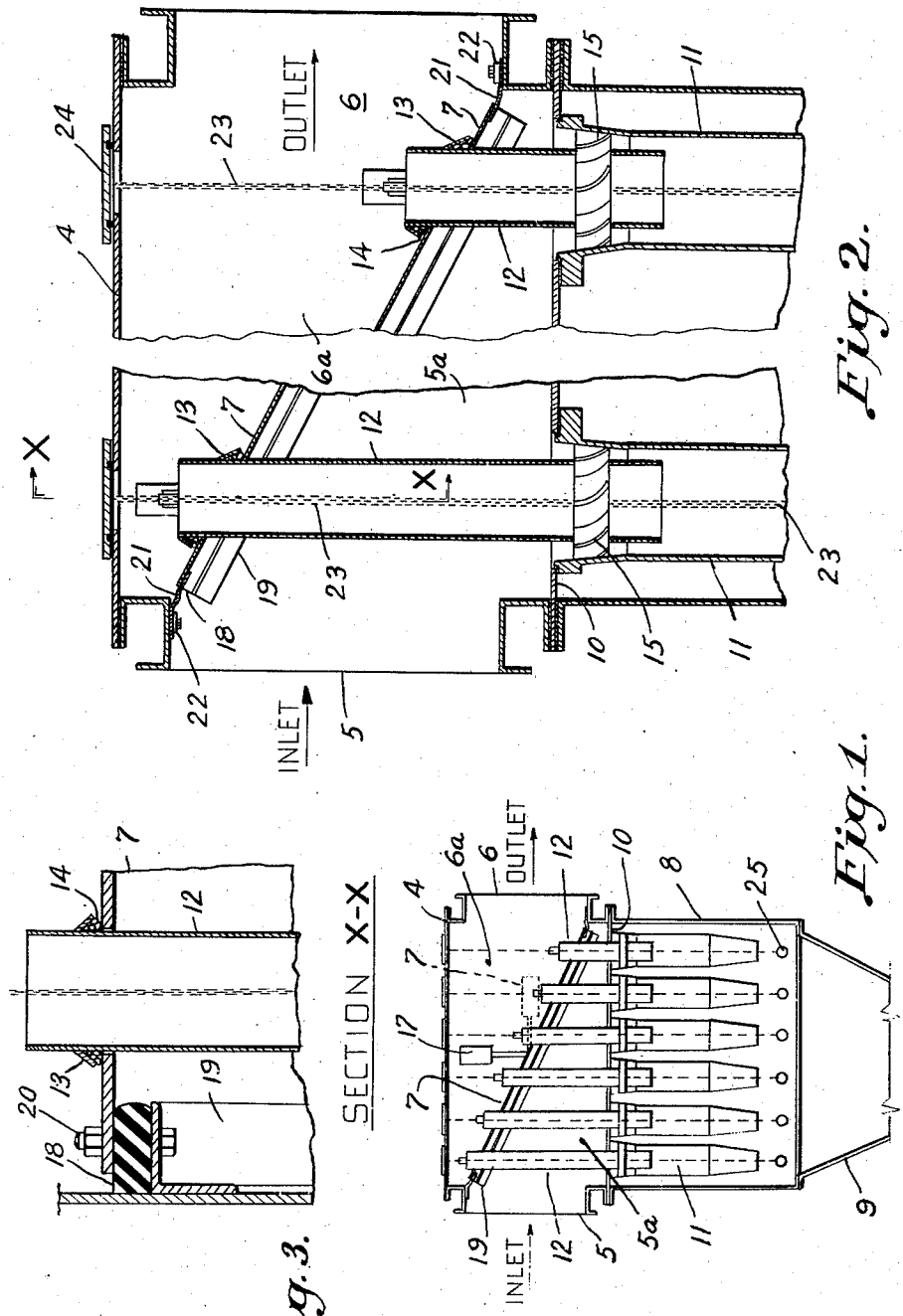
INVENTOR
John R. Shoffner
BY
Green & McCallister
ATTORNEY Patented Mar. 30, 1948

2,438,827

UNITED STATES PATENT OFFICE 2,438,827

DUST COLLECTOR VIBRATOR

John R. Shoffner, Kitanning, Pa.

Application April 2, 1945, Serial No. 586,154

2 Claims. (Cl. 183—76)

This invention relates to dust collecting apparatus and particularly to apparatus for mechanically separating dust from the air or other gas by which it is entrained. There are a number of mechanical dust collectors on the market and all such mechanisms are more or less effective so long as the air passages thereof do not become clogged and thus prevent the intended functioning of the apparatus.

The object of my invention is to provide a dust collecting apparatus such that the possibility of dust clogging the air passages thereof is minimized to the extent that the apparatus will always be highly effective in collecting and removing dust from the gas traversing it and will not require frequent cleaning operations such as are employed with the various types of mechanical dust collectors now in use.

A further object is to provide simple and effective means for preventing dust from collecting in the intake passages of a mechanical dust collector in quantities and under conditions such that the effectiveness of the apparatus will be progressively decreased during operation.

A further object of the invention is to provide means for insuring that the dust-laden gas, traversing the collector, will not prematurely deposit dust within the gas passages of the collector and thereby obstruct the free passage of the gas and reduce the effectiveness of the apparatus.

These, and other objects, which will be made more apparent throughout the further description of my invention, are attained by apparatus embodying the features herein illustrated and described.

In the drawings, accompanying and forming a part of my invention,

Figure 1 is a diagrammatic vertical sectional view of dust collecting apparatus embodying my invention.

Figure 2 is an enlarged, fragmental, sectional view of a portion of the apparatus illustrated in Figure 1, the section having been taken along the line of the section of Figure 1.

Figure 3 is a fragmental, sectional view along the line X—X of Figure 2 on a somewhat enlarged scale.

For the purpose of disclosing the principle of my invention and one embodiment thereof, I have disclosed in the drawings the general structural details of a well known commercial type of mechanical dust collector. As shown in Figure 1, the dust collector consists of a housing 4 which is provided with an inlet port 5 and an outlet port 6. The ports are separated one from the other by an inclined tube sheet 7 which divides the housing into an inlet chamber 5a, communicating with the port 5 and an outlet chamber 6a communicating with the port 6.

The housing 4 is supported by a housing 8 which terminates at its lower end in a hopper 9. For convenience of illustration, the hopper 9 is shown as broken away, but it is to be understood that it is merely a converging duct for conducting away collected dust and that the converging walls thereof direct the collected dust toward a dust discharge port formed at the lower end of the hopper.

A second tube sheet 10 forms a wall of each of the housings 4 and 8 or forms a partition between those housings. As shown, the tube sheet 10 extends horizontally, separates the inlet chamber of the housing 4 from the dust collecting chamber within the hopper 9 and supports a plurality of collecting tubes 11. Each of the tubes 11 extends vertically downward from the tube sheet 10; terminates within the housing 8 at a point well above the hopper 9; and, each such tube is shown as converging at its lower end so as to provide a discharge nozzle or throat which is substantially less in cross sectional area than the inlet end of the tube and also than the intermediate portion thereof.

The inclined tube sheet 7 supports the upper ends of a plurality of tubes 12. Each tube 12 projects through the sheet 7 extends vertically downward and projects into one of the collecting tubes 11 with which it is axially aligned in concentric relationship. As disclosed by Figure 2, each of the tubes 12 is of substantially less diameter than its co-operating tube 11, with the result that the interior of each of the tubes 11 communicates directly with the inlet chamber 5a of the housing 4 through the annular passage located between its inner surface and the external surface of the tube 12 which projects into it. The tubes 12 may be termed "outlet tubes," since each provides a gas passage through which the gas moves upwardly from the interior of a tube 11 and into the outlet chamber 6a of the housing 4.

Each of the tubes 12 is supported by the diaphragm 7 through the medium of a ring or collar 13 which surrounds the tube and is welded to its external surface adjacent the upper end thereof. Each collar 13 is adapted to enclose a gasket or gasket material 14 for sealing the joint between the tube 12 and its supporting plate 7. The length of each tube 12 is such that it extends well into its co-operating collecting tube 11. The lower ends of each tube 12 are preferably on a level with each other and each is surrounded by a series of vanes 15, located within the tube 11 adjacent the upper end thereof and at a point above the lower end of the tube 12.

Each series of vanes 15 (see Figure 2) is so arranged as to direct the gas from the chamber 5a downwardly into the surrounding tube 11 and to induce therein a whirling motion which will create sufficient centrifugal force to throw the entrained dust outwardly or toward the surface of the tube 11. It will also be apparent that the gas passage, between each tube 12 and its surrounding tube 11, is considerably constricted with relation to both the volumetric capacity of the chamber 5a and the cross sectional area of the intermediate portion of the tube 11. As a result, the velocity of the gas, entering each tube 11, will be materially accelerated as it traverses the constricted passage and will then be decelerated as it moves into the unrestricted part of the tube 11. This deceleration contributes to and is accomplished simultaneously with the reversal of flow of the gas as it turns to enter and move upwardly through the co-operating tube 11. As a result, the entrained dust is subjected to centrifugal force and its inertia causes it to continue to move downwardly through the tube 11 and into the hopper 9 as the gas reverses its direction of travel and moves upwardly. The gas moving upwardly through the tubes 12 enters the outlet chamber 6a and from there passes through the outlet port 6.

The flow of gas through the dust collector may be occasioned by either suction or pressure, although placing the fan or blower on the outlet side of the collector contributes to the long life of the fan, since abrasive dusts are collected and removed from the gas before the gas enters the fan. It should also be understood that the temperature of the gas traversing the dust collector passages is of importance and should be above the dew point of the gas in order to prevent moisture collection on the surfaces of the gas passages and thus interfere with the contemplated free movement of the dust as it is extracted from the moving gas.

One of the features of my invention is that the tubes 12 are subjected to the vibratory action of a vibrator throughout the entire dust collecting operation. This is accomplished by subjecting the tube sheet 7 to the action of a vibrator 17, diagrammatically illustrated in Figure 1. The vibrator may be of any suitable type and is preferably electrically actuated. It may be located within the housing 4 and preferably within the outlet chamber 6a of the apparatus. It may also occupy any suitable position such as the full line position shown in Figure 1 or the dotted line position also shown in Figure 1. It is desirable to impart several hundred vibrations to the sheet per minute, although the speed and power of the vibrator may be varied to suit the various conditions encountered.

Where the vibratory impulses are imposed on a tube carrying sheet or plate, such as the tube sheet 7, it is desirable to so mount the sheet that it will not only impart the vibrations to the tubes carried by it, but may move in so doing. The tube sheet 7 is, therefore, mounted on resilient supports carried by opposed walls of the housing 4.

As shown in Figures 2 and 3, the sheet 7 is supported on two resilient supports 18, each engaging a portion of the sheet adjacent one lateral edge thereof and each in itself supported by an angle iron 19 carried by a lateral wall of the housing 4. The sheet 7 and the resilient strip 18 are held in place on the angle 19 by bolts 20 which are spaced along the angle and so as to insure a gas-tight fit between the plate 7 and the resilient strip 18, thus preventing leakage from the chamber 5a to the chamber 6a. The bolt openings in the sheet 7 are enlarged so that the sheet may fully respond to its resilient mounting. As shown in the drawings, the sheet 7 is of such length that it terminates short of the end walls of the housing 4. For this reason, a flexible strip 21 extends clear across the housing 4 at each end of the sheet 7 and is secured to the sheet and also the wall of the housing, thus supplementing the plate in dividing the interior of the housing into the chambers 5a and 6a but, at the same time, permitting the sheet to move free of the housing walls, in so far as the supporting strips 18, the bolts 20 and the angle irons 19 permit free movement.

It will be understood that the resilient strips are preferably formed of live rubber and that the strips 21 are flexible material which is impervious to the passage of gas. Under such conditions, both the rubber strips 18 and the flexible strips 21 co-operate to provide a seal between the chambers 5a and 6a. In the drawings, I have shown one edge of each of the strips 21 as secured to the bounding flange of the adjacent housing port by means of a nut and washer assembly 22. The other edge of the strip may be cemented to or otherwise suitably secured to the sheet 7.

The vanes 15, which surround each tube 12, are also formed of live rubber or some similar flexible material. The shape of each vane is such that, even though it is formed of flexible material, it is, nevertheless, sufficiently rigid to co-operate with other blades of its series in centering each tube 12 with relation to its co-operating tube 11. The flexible vanes 15 and the resilient mounting strips 18, however, co-operate so that the vibrations imparted to the sheet 7 are imparted to each of the tubes 12 and are highly effective in preventing dust from lodging on and adhering to those tubes.

In mechanical dust collectors, somewhat similar to the collector illustrated in the drawings, dust collects on the vanes 15 and also on the inlet port side of each of the outlet tubes 12 and, after a time, restricts the inlet passages to the collector to such an extent as to render the collector ineffective for the purpose intended or, at least, to greatly reduce its effectiveness. It is for this reason that it is desirable, if not essential, to prevent dust from lodging on and adhering to the outlet tubes 12 and to the vanes 15.

Restricting the inlet passages of the collector will occasion variations in gas flow conditions within the collector which will detract from its effectiveness. For example, a restriction of the gas passages within the chamber 5a will detract from the effectiveness of the flow reversal in separating the dust from the then upwardly moving gas. Likewise, dust collecting on or between the blades 15 will detract from their usefulness and will occasion a premature slackening of the rate of gas flow, with the result that the dust removal effect of the centrifugal force and also of the reversal of gas flow will not be fully obtained.

It will be apparent that the structure illustrated in effect, floats the plate 7 and the tubes 12 so that the vibrator 17 is fully effective in preventing dust from adhering to the tube surfaces within the chamber 5a. It will also be apparent that this floating effect is contributed to by the flexible vanes 15 and that the vibrations imparted to the vanes 15 by the tubes 12 will also be effective in preventing dust from adhering to those vanes.

In the drawings, I have illustrated a usual construction of scraper chain 23 in connection with each of the tubes 12. As shown, each scraper chain is secured to and supported by a hand hold cover 24 and extends through one pair of co-operating tubes 11 and 12 to a distance of a few inches below the throat or discharge end of each tube 11. A disk or ring 25 may be secured to the lower end of each chain to add to its weight and, consequently, its effectiveness as a scraper of the inner surfaces of both the tubes 11 and 12. During the gas flow through the collector, the whirling flow of the gas, entering each tube 11 through the associated blades 15, will impart a whirling movement to the associated chain 23 and thus contribute to its effectiveness as a scraper chain.

What I claim is:

1. In a dust collector, a casing having an outlet port and an inlet port, a tube sheet located within said casing extending across the interior thereof and separating said ports one from the other, a second tube sheet located within said casing extending across the interior thereof and located below the first mentioned tube sheet, a series of open tubes extending through, depending from and supported by said second tube sheet, in combination with means for resiliently supporting said first mentioned tube sheet, a series of open tubes extending through said first mentioned tube sheet with each tube of such series projecting into one of the tubes of the first mentioned series, a collar secured to each tube of the second mentioned series adjacent the upper end thereof and located above the first mentioned tube sheet, a separate gasket covered by each such collar and sealing the joints between the associated tube and said first mentioned tube sheet, a series of flexible blades within each tube of the first mentioned series, surrounding the associated tube of the second mentioned series and constituting a connection between such tubes, and means for imparting vibratory motion to said first mentioned tube sheet.

2. In a dust collector, a casing having an inlet port and an outlet port; a floating tube sheet located within said casing; flexible means for supporting said sheet on said casing, said sheet and its supports separating the interior of said casing into an inlet chamber communicating with said inlet port and an outlet chamber communicating with said outlet port; a series of tubes projecting through and carried by said floating sheet, the interior of each such tube communicating with both of said chambers; a support collar carried by each such tube; a gasket enclosed by each such collar and sealing the joint between said associated tube and said sheet; a second tube sheet secured to said casing; a second series of tubes carried thereby, with each tube of the first-mentioned series projecting into a tube of the second series and the interior of each tube of the second series communicating with but one of said chambers; a separate series of flexible, air-directing vanes surrounding each tube of the first series and located within the associated tube of the second series; and, means for imparting vibratory motion to said floating sheet.

JOHN R. SHOFFNER.

REFERENCES CITED

The following references are of record in the file of this patent:

UNITED STATES PATENTS

| Number | Name | Date |
|---|---|---|
| 1,781,430 | Blaney | Nov. 11, 1930 |
| 2,323,708 | Danz | July 6, 1943 |

FOREIGN PATENTS

| Number | Country | Date |
|---|---|---|
| 332,475 | Great Britain | July 24, 1930 |
| 834,509 | France | Nov. 23, 1938 |
| 289,036 | Germany | Dec. 6, 1915 |